(12) United States Patent
Lemieux et al.

(10) Patent No.: US 11,326,922 B2
(45) Date of Patent: May 10, 2022

(54) APPARATUS FOR METERING AND DISPENSING VISCOUS SUBSTANCE

(71) Applicant: ACASTI PHARMA, INC., Laval (CA)

(72) Inventors: Pierre Lemieux, Laval (CA); Simon Despins, Laval (CA); Sarya Aziz, Laval (CA); Nicolas Bissuel, Laval (CA); François Lemieux, Laval (CA)

(73) Assignee: ACASTI PHARMA, INC., Laval (CA)

( * ) Notice: Subject to any disclaimer, the term of this patent is extended or adjusted under 35 U.S.C. 154(b) by 71 days.

(21) Appl. No.: 17/053,405

(22) PCT Filed: May 9, 2019

(86) PCT No.: PCT/CA2019/050620
§ 371 (c)(1),
(2) Date: Nov. 6, 2020

(87) PCT Pub. No.: WO2019/213768
PCT Pub. Date: Nov. 14, 2019

(65) Prior Publication Data
US 2021/0239504 A1    Aug. 5, 2021

Related U.S. Application Data

(60) Provisional application No. 62/669,431, filed on May 10, 2018.

(51) Int. Cl.
*G01F 13/00* (2006.01)
*G01F 11/02* (2006.01)
(Continued)

(52) U.S. Cl.
CPC .......... *G01F 13/001* (2013.01); *G01F 11/024* (2013.01); *A23P 10/30* (2016.08); *A61J 3/07* (2013.01)

(58) Field of Classification Search
CPC .... G01F 13/001; G01F 11/024; G01F 11/021; A23P 10/30; A61J 3/07; B65B 3/32
(Continued)

(56) References Cited

U.S. PATENT DOCUMENTS 3,851,795 A    12/1974  Anderson
4,871,001 A *  10/1989  Nobuta ..................... B65B 1/22
                                                                 222/536
2012/0192528 A1  8/2012  Ansaloni et al.

FOREIGN PATENT DOCUMENTS

DE          1183426        12/1964
DE          19801405        7/1999
(Continued)

OTHER PUBLICATIONS

English Translated Abstract—DE 19801405A1.
English Translation—DE 1183426B.

*Primary Examiner* — Vishal Pancholi
*Assistant Examiner* — Robert K Nichols, II
(74) *Attorney, Agent, or Firm* — Norton Rose Fulbright LLP

(57) ABSTRACT

An apparatus for metering and dispensing a predetermined amount of a viscous substance includes an inlet fluidly connected to a supply flow path that branches into a metering flow path and a first dispensing flow path which branches into a second dispensing flow path that is angled relative to the first dispensing flow path. The apparatus also includes a supply valve disposed in the supply flow path, a dispensing valve disposed in the first dispensing flow path and the second dispensing flow path, a metering piston disposed in the metering flow path, and a dispensing piston. A method of metering and dispensing a volume of a viscous substance is also provided.

20 Claims, 8 Drawing Sheets

(51) Int. Cl.
    *A23P 10/30*    (2016.01)
    *A61J 3/07*     (2006.01)
(58) Field of Classification Search
    USPC .................................................. 222/1, 361
    See application file for complete search history.

(56) References Cited

FOREIGN PATENT DOCUMENTS

| EP | 1018330 A2 | 7/2000 |
| EP | 1018330 A3 | 7/2000 |
| WO | WO2014161089 | 10/2014 |

* cited by examiner

APPARATUS FOR METERING AND DISPENSING VISCOUS SUBSTANCE

CROSS-REFERENCE

The present application claims priority to U.S. Provisional Application No. 62/669,431, entitled "Encapsulation Apparatus", filed May 10, 2018, and incorporated by reference herein in its entirety.

TECHNICAL FIELD

The present disclosure relates to apparatuses. In particular, the present disclosure relates to apparatuses for metering predetermined amounts of viscous substances and filling capsules with predetermined amounts of viscous substances.

BACKGROUND OF THE ART

In the pharmaceutical industry, it is generally known that an active ingredient may be provided in a capsule to be orally consumed or inserted into a patient as a suppository. Based on the form of the active ingredient, the capsule may be a hard capsule or a soft capsule. The active ingredient may be provided in the form of a powdered or granular substance or a viscous substance (e.g., a liquid, gel or paste). Most of the active ingredients are formulated with a variety of excipients to obtain a physicochemical state enabling the chosen galenic form such as hard or soft capsule. The addition of excipient will lower the final concentration of the active ingredient in the drug and may impact the stability of the active ingredient. Encapsulation is a process by which a substance containing an active ingredient is enclosed in a capsule.

Processes for filling pharmaceutical highly viscous materials have been described. For example, U.S. Pat. No. 4,408,641 discloses an apparatus for filing viscous substance into hard gelatin capsules, while heating and stirring. As another example, U.S. Pat. No. 4,192,361 discloses apparatus for dispensing liquid or pasty substances to gelatin capsules and the like, in particular for dispensing pharmaceutical products thereto. As yet another example, U.S. Pat. No. 4,545,412 discloses a filling machine for capsules, in which a pharmaceutical paste contained in a hopper is fed under pressure to a dosing chamber.

Such prior art systems and methods may be suitable for their purposes. However, improvements to the prior art are always desirable. For example, it may be desirable to develop a method and/or apparatus of metering and dispensing a viscous fluid which may be less prone to creating air bubbles in metering and dispensing at least some viscous fluids for at least some applications, in comparison with at least some prior art methods and apparatuses metering and dispensing the same viscous fluids in at least the same applications.

SUMMARY

In accordance with one aspect, there is provided an apparatus for metering and dispensing a predetermined amount of a viscous substance, comprising: an inlet fluidly connected to a supply flow path that branches into a metering flow path and a first dispensing flow path, the first dispensing flow path branching into a second dispensing flow path that is angled relative to the first dispensing flow path; a supply valve movable between an open position and a closed position, the supply valve disposed in the supply flow path; a dispensing valve movable between an open position and a closed position, the dispensing valve disposed in the first dispensing flow path and the second dispensing flow path; a metering piston disposed in the metering flow path and being movable in the metering flow path between an unloaded position and a loaded position; and a dispensing piston movable between a retracted position in which the dispensing piston is disposed outside of the dispensing valve and an extended position in which the dispensing piston extends through the dispensing valve into the second dispensing flow path to dispense the predetermined amount of the viscous substance via the second dispensing flow path.

In some embodiments, the apparatus further comprises a structure configured to pressurize and supply the substance to the inlet, and wherein the metering piston is configured to be moved from the unloaded position to the loaded position solely by the pressurized substance in the metering flow path pressing on the metering piston while the supply valve is in the open position.

In some embodiments, the dispensing valve is a rotary valve defining a bore therethrough, the bore being: i) out of alignment with the first dispensing flow path and in alignment with the second dispensing flow path when the dispensing valve is in the closed position, and ii) in alignment with the first dispensing flow path and out of alignment with the second dispensing flow path when the dispensing valve is in the open position.

In some embodiments, the supply valve is in the open position, a bore of the supply valve is aligned with the supply flow path, when the supply valve is in the closed position, the bore of the supply valve out of alignment with the supply flow path, when the dispensing valve is in the open position, a bore of the dispensing valve is aligned with the first dispensing flow path, and when the dispensing valve is in the closed position, the bore of the dispensing valve is aligned with the second dispensing flow path and with the dispensing piston, the dispensing piston extending through the bore of the dispensing valve in the extended position.

In some embodiments, a portion of the supply flow path downstream of the supply valve, a portion of the metering flow path upstream of the metering piston, and a portion of the first dispensing flow path upstream of the dispensing valve define: a first enclosed volume when the supply valve and the dispensing valve are in the closed position and the metering piston is in the loaded position, and a second enclosed volume when the supply valve and the dispensing valve are in the closed position and the metering piston is in the unloaded position; the first enclosed volume is larger than the second enclosed volume, a difference between the first and second enclosed volumes defines the predetermined amount of the viscous substance.

In some embodiments, when the dispensing valve is in the closed position, a bore of the dispensing valve is aligned with the second dispensing flow path.

In some embodiments, when the dispensing valve is in the closed position, the dispensing piston is aligned with the bore of the dispensing valve and the second dispensing flow path, the dispensing piston being sized to sweep through the bore and the second dispensing flow path to dispense substantially all of the substance contained in the bore.

In some embodiments, when the dispensing piston is in the extended position, an end of the dispensing piston aligns with an outlet defined by the second dispensing flow path.

In some embodiments, when the dispensing piston is in the extended position, an end of the dispensing piston extends out of an outlet defined by the second dispensing flow path.

In some embodiments, the supply flow path is angled relative to the first dispensing flow path and the first dispensing flow path is angled relative to the second dispensing flow path.

In some embodiments, apparatus comprises a stopper that defines the loaded position of the metering piston and thereby defines a length of a stroke of the metering piston between the unloaded position and the loaded position, the stopper being adjustable to adjust the length of the stroke.

In some embodiments, the apparatus further comprises a first actuator operatively connected to the supply valve to move the supply valve between the open position and the closed position; a second actuator operatively connected to the dispensing valve to move the dispensing valve between the open position and the closed position; a third actuator operatively connected to the metering piston to move the metering piston from the loaded position to the unloaded position; and a fourth actuator operatively connected to the dispensing piston to move the dispensing piston from the retracted position to the extended position.

In some embodiments, the apparatus further comprises a controller operatively connected to the first, second, third and fourth actuators to operate the first, second, third and fourth actuators.

In some embodiments, the apparatus further comprises a hopper fluidly connected to the inlet, the hopper including a piston operable by a fifth actuator to pressurize and supply the viscous substance into the inlet, and the controller is operatively connected to the fifth actuator to operate the fifth actuator.

In another aspect, there is provided a method of metering and dispensing a volume of a viscous substance, comprising: filling, via a supply valve disposed in a supply flow path: a part of the supply flow path downstream of the supply valve, a part of a dispensing flow path fluidly connected to the supply flow path downstream of the supply valve, and a part of a metering flow path fluidly connected to the supply flow path downstream of the supply valve, the part of the metering flow path being defined by a metering piston disposed in the metering flow path in an unloaded position; closing a dispensing valve disposed in the dispensing flow path to define the part of the dispensing flow path; pressurizing the viscous substance to a pressure sufficient for the viscous substance to move the metering piston from the unloaded position to a predetermined loaded position and thereby predetermining the volume of the viscous substance to be dispensed; after the metering piston reaches the loaded position, closing the supply valve to enclose the volume within the parts of the supply flow path, the dispensing flow path and the metering flow path, and opening the dispensing valve; after the opening the dispensing valve, moving the metering piston to the unloaded position to move the volume of the viscous substance into the dispensing valve; after the moving the metering piston to the unloaded position, moving the dispensing valve to a position in which the bore of the dispensing valve aligns with both a dispensing piston and an outlet; and moving the dispensing piston through the bore of the dispensing valve to dispense the volume of the viscous substance via the outlet.

In some embodiments, the moving the dispensing piston through the bore of the dispensing valve includes moving the dispensing piston into the outlet.

In some embodiments, the moving the dispensing piston into the outlet includes extending the dispensing piston to extend out of the outlet.

In some embodiments, the closing the dispensing valve is executed prior to the filling.

In some embodiments, the position in which the bore of the dispensing valve aligns with both the dispensing piston and the outlet is a position in which the dispensing valve fluidly interrupts the dispensing flow path.

In some embodiments, method comprises adjusting the loaded position to adjust the volume of the viscous substance to be dispensed.

Many further features and combinations thereof concerning the present improvements will appear to those skilled in the art following a reading of the instant disclosure.

DETAILED DESCRIPTION

The embodiments that follow are non-limiting examples of the present technology.

Figure 1:
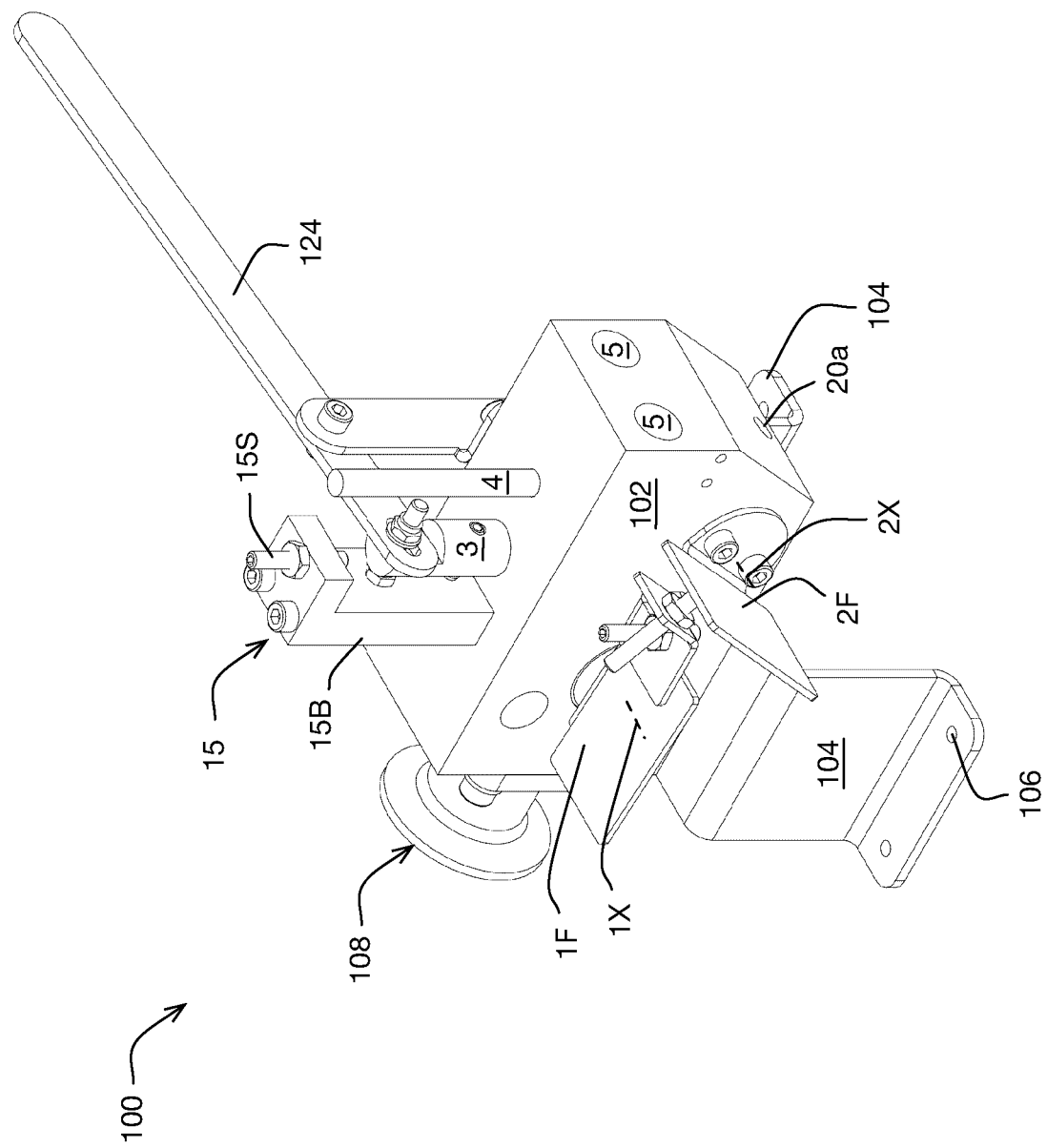
FIG. 1 is perspective view of an apparatus for metering and dispensing a viscous substance.
Figure 4:
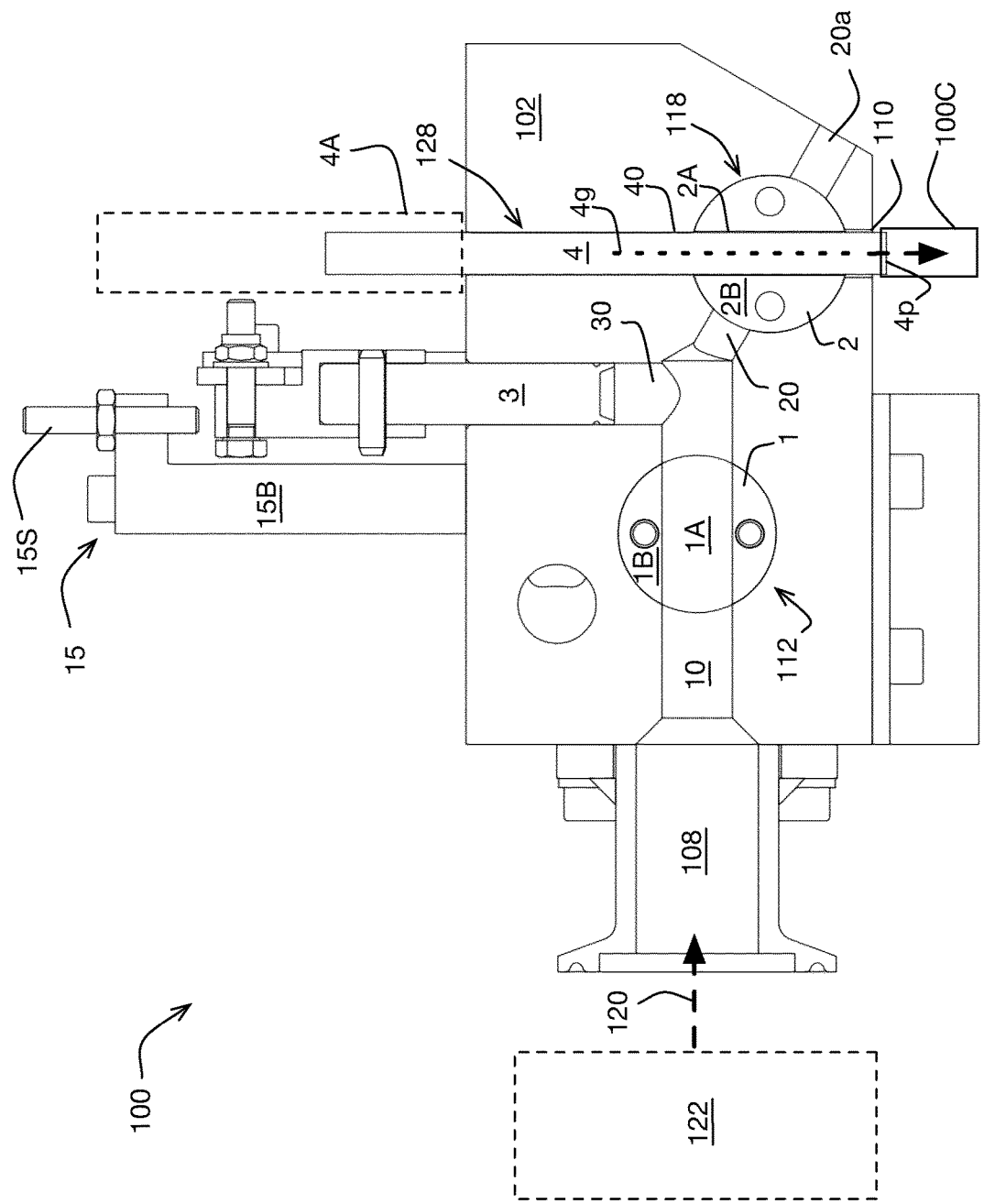
FIG. 4 is a cross-section of the apparatus of FIG. 1, showing the apparatus in a third operating configuration thereof.

FIG. 1 shows an example an apparatus 100 for metering/dispensing a predetermined amount of a viscous substance containing an active ingredient into an external capsule 100C (FIG. 4). In the present embodiment, the apparatus 100 includes a body 102 mountable to a surface (e.g., a table top, a surface of encapsulation equipment, etc.) via mounting brackets 104 which may include holes 106 for receiving bolts, screws and/or other fasteners therethrough for securing the apparatus 100 to the surface or other structure.

Figure 2:
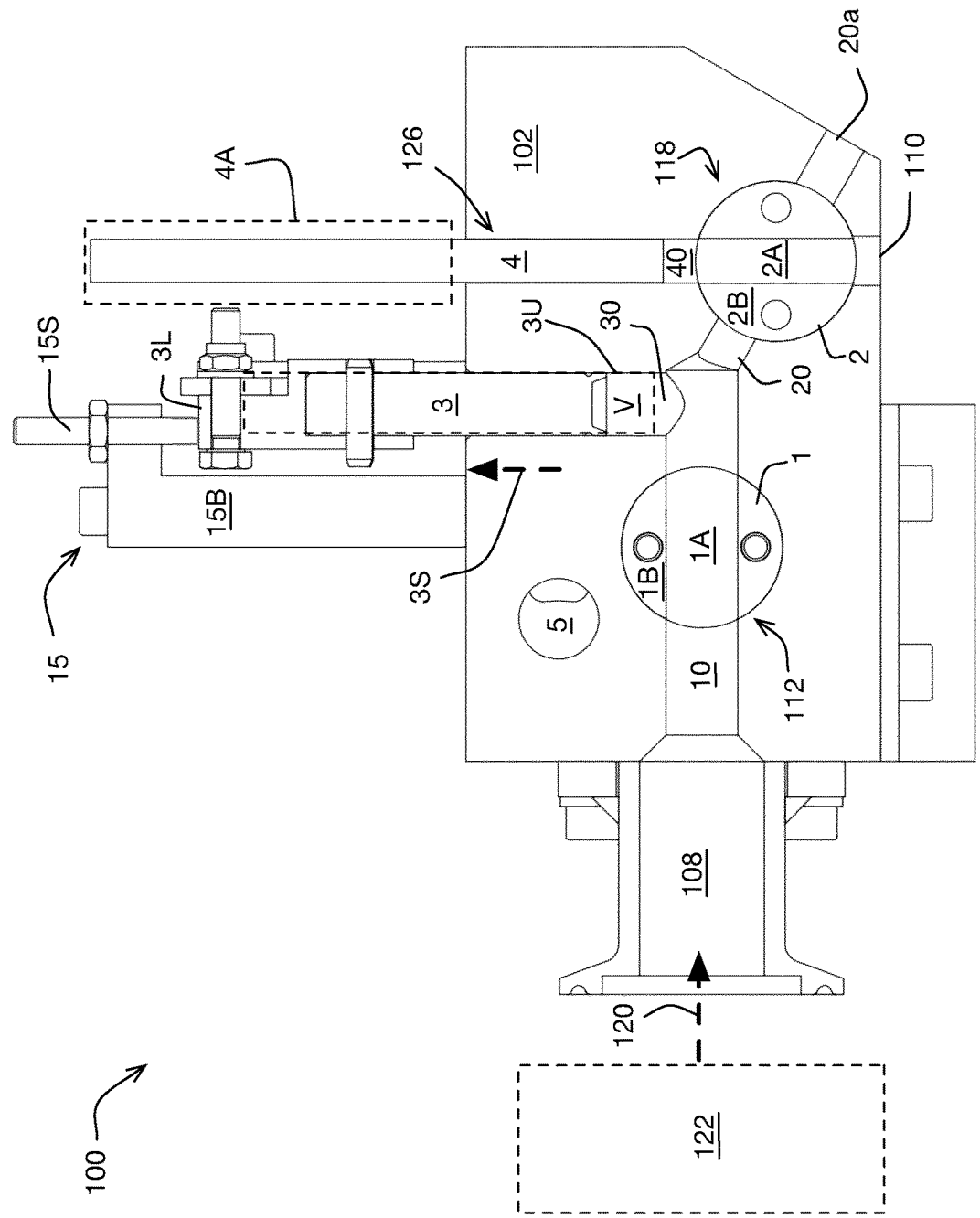
FIG. 2 is a cross-section of the apparatus of FIG. 1, showing the apparatus in a first operating configuration thereof.
Figure 3:
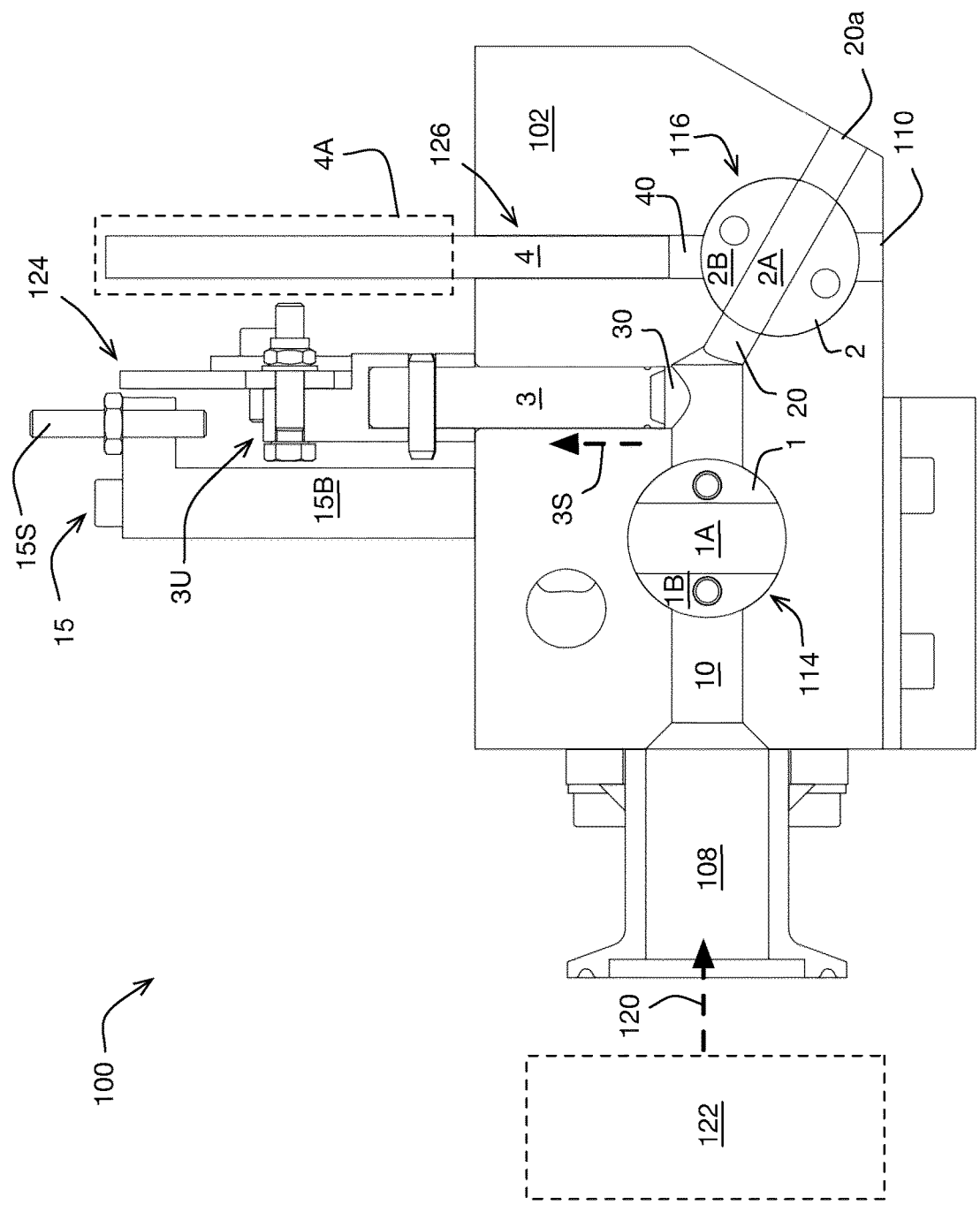
FIG. 3 is a cross-section of the apparatus of FIG. 1, showing the apparatus in a second operating configuration thereof.

The body 102 defines an inlet 108 via which a viscous substance to be metered and dispensed is supplied to the apparatus 100. To this end, the inlet 108 may have any suitable form and may be fed with the viscous substance from any suitable source. Referring to FIG. 2, the body 102 further defines an outlet 110 via which the metered viscous substance is dispensed into a capsule 100C or other suitable container. The outlet 110 may be an orifice in a lower surface of the body 102, and/or may include a tip or funnel to facilitate introduction of the viscous substance into the capsule 100C or other suitable container.

The capsule 100C or other suitable container may be positioned at or proximate the outlet 110 using any suitable system, such as an automated system that positions each given capsule 100C at or near the outlet 110 in time for the dispensing of the viscous substance into the given capsule 100C, moves the given capsule 100C away after the dispensing thereof is completed, and positions a subsequent capsule 100C in place of the preceding capsule 100C to be filled via a subsequent dispensing step.

Still referring to FIG. 2, the apparatus 100 further includes a rotational supply valve 1, a rotational dispensing valve 2, a metering piston 3, and a dispensing piston 4. In the present embodiment, the supply valve 1 is disposed in a supply flow path 10 defined in the body 102, downstream of the inlet 108. Downstream of the supply valve 1, the supply flow path 10 branches into a dispensing flow path 20 and a metering flow path 30 that are likewise defined in the body 102. The dispensing valve 2 is disposed in the dispensing flow path 20. The metering piston 3 is disposed in the metering flow path 30. The supply flow path 10, the dispensing flow path 20 and the metering flow path 30 are defined by channels bored or machined into the body 102, but other manufacturing methods are also contemplated.

For example, it is contemplated that one or more of, or parts of one or more of, the supply flow path 10, the dispensing flow path 20 and the metering flow path 30 could be defined by pipe(s) or other conduits suitable for conveying one or more viscous substances that the apparatus 100 may be designed to meter/dispense. The particular size and structure of the flow paths 10, 20, 30 may be selected to suit each particular embodiment and application of the apparatus 100, such as based on the type and quantities of the material(s) to be metered/dispensed for example.

As shown in FIG. 2, the dispensing flow path 20 and the metering flow path 30 are angled with respect to the supply flow path 10. It is contemplated that the supply flow path 10, the dispensing flow path 20, and the metering flow path 30 may be provided in other configurations. For example, the flow paths 10, 20, 30 may be provided in a T-shaped configuration. As another example, it is contemplated that in some embodiments, two of the flow paths 10, 20, 30 may be arranged coaxially relative to each other. Other configurations are likewise contemplated, so long as in such other configurations at least one of the flow paths 10, 20, 30 is angled with respect to the other two flow paths 10, 20, 30 and/or so long as the metering and dispensing functionalities described in this document are provided.

Still referring to FIG. 2, the supply valve 1 includes a cylindrical body 1B that defines a transverse bore 1A therethrough. The transverse bore 1A extends from one end of the supply valve 1 to an opposite end of the supply valve 1 along a center thereof. The cylindrical body 1B is rotatably received in a corresponding aperture/seat (not labeled) defined in the body 102 of the apparatus 100. Similarly, the dispensing valve 2 includes a cylindrical body 2B that defines a transverse bore 2A therethrough. The transverse bore 2A extends from one end of the dispensing valve 2 to an opposite end of the dispensing valve 2 along a center thereof. The bodies 1B, 2B of the valves 1, 2 may have a different shape, such as spherical for example. In such alternative embodiments, the body 102 of the apparatus 100 may define different seats to suit the different shapes of the bodies 1B, 2B of the valves 1, 2. In some embodiments, bodies 1B, 2B of the valves 1, 2 may be different from each other, and may be received in corresponding seats in the body 102 of the apparatus 100 to provide for the flow metering and dispensing arrangement described next.

In the embodiment shown in FIGS. 1-4, the supply valve 1, and more particularly the body 1B thereof, is rotatable between an open position 112 (FIG. 2) in which the bore 1A aligns with the supply flow path 10, and a closed position 114 (FIG. 3) in which the bore 1A thereof is out of alignment with the supply flow path 10. In the present embodiment, the bore 1A is out of alignment with the supply flow path 10 by being angled with respect to the supply flow path 10, for example, by being perpendicular to the supply flow path 10.

The supply valve 1 thereby fluidly interrupts the supply flow path 10. Similarly, the dispensing valve 2, and more particularly the body 2B thereof, is rotatable between an open position 116 (FIG. 3) in which the bore 2A thereof aligns with the dispensing flow path 20, and a closed position 118 (FIGS. 2 and 4) in which the transverse bore 2A is out of alignment with the dispensing flow path 20 to thereby fluidly interrupt the dispensing flow path 20.

In the present embodiment the valves 1, 2 are operable between their respective open 112, 116 and closed 114, 118 positions manually. To this end, and now referring briefly back to FIG. 1, the supply valve 1 includes a flange 1F that extends outward from the body 102 and from an external surface of the encapsulation device 100. The flange 1F may be manually grasped and turned about the rotation axis 1X of the supply valve 1 to move the supply valve 1 between its open position 112 and its closed position 114. Similarly, the dispensing valve 2 includes a flange 2F that extends outward from the body 102 and from the external surface of the encapsulation device 100. The flange 2F may be manually grasped and turned about the rotation axis 2X of the dispensing valve 2 to move the dispensing valve 2 between its open position 116 and its closed position 118. The flanges 1F, 2F are one example of manual actuators that may be used to move the valves 1, 2 between their respective open 112, 116 and closed 114, 118 positions. The flanges 1F, 2F provide a visual indication of the position (open or closed) of each of the rotary valves 1 and 2.

As shown schematically in FIG. 2, a viscous substance 120 may be supplied, from a suitable source 122 into the inlet 108 of the apparatus 100. The viscous substance 120 may be supplied into the inlet 108 from a suitable pressurizing means (such as an actuated piston for example) under a pressure which may be selected as a function the viscosity of the particular viscous substance 120 to be metered and dispensed, and more particularly a pressure sufficient to push the substance through the parts of the apparatus 100 as described next.

In some cases, as a start-up sequence of the apparatus 100, the valves 1, 2 may be moved into their open positions 112, 116, and the viscous substance 120 under pressure may be pushed through the supply flow path 10 into the dispensing and metering flow paths 20, 30 and out of an open end 20a of the dispensing flow path 20 so as to fill and remove air from these flow paths 10, 20, 30 and the bore 1A of the supply valve 1. The dispensing valve 2 may then be moved to its closed position 118 and the substance 120 contained in its bore 2A may be dispensed therefrom via the outlet 110 by moving the dispensing piston 4 through the bore 2A (e.g. see FIG. 4). The apparatus 100 may thereby be prepared to start metering and dispensing the substance 120. It is contemplated that a different start-up procedure may be used, such as simply by executing metering and dispensing steps until accurate metering and dispensing is achieved.

In an in-use phase of the apparatus 100 (for example, after a suitable start-up sequence has been executed) and under continued suitable pressurization of the substance 120, when the supply valve 1 is in the open position 112, the viscous substance flows (i.e. is pushed by the pressure) via the supply flow path 10, through the transverse bore 1A of the supply valve 1, into the metering flow path 30. At this time, the dispensing valve 2 being in the closed position 118, the body 2B of the dispensing valve 2 stops the viscous substance 120 from flowing past the body 2B. The viscous substance 120 therefore exerts pressure via the metering flow path 30 on the metering piston 3.

As shown schematically in FIG. 2, the metering piston 3 is movable within the metering flow path 30 between an unloaded position 3U and a loaded position 3L. In this embodiment, the metering piston 3 is configured to be a floating piston, meaning that when a sufficient force is applied thereto by the substance 120 from the metering flow path 30 upstream of the metering piston 3, the metering piston 3 moves to the loaded position 3L solely by the force from the substance 120.

In some embodiments, the metering piston 3 and at least a corresponding part of the metering flow path 30 may be non-vertical and/or the metering piston 3 may be biased toward its unloaded position 3U by a suitable biasing member, such as a spring. In some embodiments, a suitable electronic actuator may be operatively connected to the metering piston 3 to move the metering piston 3 between its unloaded position 3U and its loaded position 3L.

Using a floating piston and the pressurization of the substance 120 helps avoid formation of air bubbles in the substance 120, and helps improve accuracy of the metering provided by the apparatus 100, and hence helping to increase an accuracy of each dosage (predetermined amount of viscous substance 120) dispensed to the capsule 100C.

Still referring to FIG. 2, in the present embodiment, the loaded position 3L is defined by an adjustable stopper 15. More particularly, the adjustable stopper 15 includes a body 15B connected to and extending upward from the external surface of the body 102 of the apparatus 100, and an adjustment screw 15S received in a corresponding threaded aperture defined through the body 15B. As the viscous substance 120 enters and fills the metering flow path 30 upstream of the metering piston 3 and moves the metering piston 3 away from the unloaded position 3U as shown with arrow 3S in FIG. 2. At a given point, the metering piston 3 abuts against the adjustment screw 15S which prevents the metering piston 3 from moving any further away from the unloaded position 3U. This position is the loaded position 3L of the metering piston 3.

Threading the adjustment screw 15S further into the body 15B stops movement of the metering piston 3 and thus reduces a length of a stroke 3S of the metering piston 3, which is equal to a distance between the unloaded position 3U and the loaded position 3L. As explained below, the stroke 3S defines, and therefore meters, a volume (V) (FIG. 2) of the viscous substance 120 that will be dispensed by the apparatus 100.

Once the viscous substance 120 has moved the metering piston 3 to the loaded position 3L as shown in FIG. 2, the supply valve 1 may be rotated to its closed position 114 to fluidly block the supply flow path 10. It is noted that in other embodiments, a different type of supply valve 1 which is not necessarily a rotary valve, such as a gate valve for example, may be used to provide for this function. Now referring to FIG. 3, as shown, with the supply valve 1 in the closed position 114, the dispensing valve 2 may be moved to its open position 116 and the metering piston 3 may be moved to its unloaded position 3U.

Referring briefly back to FIG. 1, in the present embodiment, an active actuator 124 in the form of a lever 124 is provided. The lever 124 is operatively connected to the metering piston 3 as shown in FIG. 1 to allow an operator of the apparatus 100 to apply a manual force to the metering piston 3 to apply pressure to and thereby move the metering piston 3 to its unloaded position 3U while the supply valve 1 is in the closed position 114 and the dispensing valve 2 is in the open position 116. In other embodiments, an electronic actuator may be operatively connected to the metering piston 3 instead of or in addition to the lever 124 to provide for this function.

Referring back to FIG. 3, because at this stage the relevant portions of the flow paths 10, 20, 30 are filled with the viscous substance 120, as the metering piston 3 is moved/actuated to its unloaded position 3U, the metering piston 3 moves a volume of the viscous substance 120 from: i) a portion of the supply flow path 10 downstream of the supply valve 1, and/or ii) a portion of the dispensing flow path 20 upstream of the dispensing valve 2, and/or iii) the metering flow path 30, into the transverse bore 2A of the dispensing valve 2. In this embodiment, the volume of the viscous substance 120 moved into the transverse bore 2A is equal to the volume V defined by the stroke 3S of the metering piston 3. During this movement/actuation step, the supply valve 1 prevents backflow of the viscous substance 120 from the metering flow path 30 into the supply flow path 10, and thereby helps improve an accuracy of the metering of the viscous substance 120 provided by the apparatus 100.

Once the movement/actuation of the metering piston 3 to move the viscous substance 120, in an amount equal to the volume V, into the transverse bore 2A is completed, the dispensing valve 2 may be moved to its closed position 118 for dispensing the now metered viscous substance 120 disposed in the transverse bore 2A from the apparatus 100. In this embodiment, the dispensing function is provided by the dispensing piston 4. To this end, the dispensing piston 4 is movably, and more particularly translationally, disposed in a vertical dispensing flow path 40 that traverses the dispensing valve 4. The dispensing piston 4 is disposed in and movable in the dispensing flow path 40 between a retracted position 126 (FIG. 3) to an extended position 128 (FIG. 4).

In the present embodiment, the vertical dispensing flow path 40 extends from a top surface of the apparatus 100 to a bottom surface of the apparatus 100 and at a bottom end thereof defines the outlet 110 of the apparatus 100. A top end of the dispensing piston 4 extends out of a top end of the vertical dispensing flow path 40 and connects to an active actuator 4A, which is shown schematically in FIGS. 2-4. In the present embodiment, the active actuator 4A is a manual actuator similar to the actuator 124 described above, allowing an operator to manually move the dispensing piston 4 between the retracted position 126 (FIG. 3) and the extended position 128 (FIG. 4). To preserve clarity of the drawings and this description, the active actuator 4A is therefore shown only schematically and is not described in detail.

In other embodiments, the active actuator 4A may be any suitable powered actuator, such as a hydraulic, pneumatic, or electric actuator, powered and operated by a suitable corresponding control system and power source to move the dispensing piston 4 between the retracted position 126 and the extended position 128 to carry out the dispensing function as described herein. Similarly, the dispensing flow path 40 need not be vertical, so long as the functionality described herein is provided.

Now referring to FIG. 4, when the dispensing valve 2 is in its closed position 118, the bore 2A of the dispensing valve 2 lines up with the vertical dispensing flow path 40 and thereby allows the dispensing piston 4 to move from the retracted position 126, through the bore 2A of the dispensing valve 2, to the extended position 128. The dispensing piston 4 is shaped to sweep the inner surface of the body 102 of the apparatus 100 defining the dispensing flow path 40 and the inner surface of the body 2B of the dispensing valve 2 as the dispensing piston 4 moves relative thereto, to dispense substantially all of the substance contained in the bore 2A at the time. It is contemplated that any suitable and compatible materials, construction and relative sizing/finish, of the dispensing piston 4, the bore 2A and the dispensing flow path 40 may be used to provide for this function.

Accordingly, as the dispensing piston 4 moves into and through the bore 2A of the dispensing valve 2, and then through the bottom end of the dispensing flow path 40, the dispensing piston 4 dispenses the viscous substance 120 contained in the bore 2A of the dispensing valve 2 from the outlet 110 of the apparatus 100. As described above, in the present embodiment, the viscous substance 120 is dispensed from the outlet 110 into a capsule 100C disposed at or proximate to the outlet 110.

To help improve the dispensing function, and as shown in FIG. 4, in the extended position 128, a bottom end of the dispensing piston 4 lines up with the outlet 110 of the apparatus 100. The lining up of the bottom end of the dispensing piston 4 with the outlet 110 of the apparatus 100 in the extended position 128 helps ensure that all of the viscous substance 120 contained in the bore 2A of the dispensing valve 2 is dispensed from the outlet 110 of the apparatus 100.

In other embodiments, and as shown schematically in dashed line in FIG. 4, the dispensing piston 4 in the extended position 128 extends out of the outlet 110 to help ensure that all of the viscous substance 120 contained in the bore 2A of the dispensing valve 2 is dispensed from the outlet 110. In some such embodiments, a portion of the dispensing piston 4 may be inserted into the capsule 100C or other container to be filled, to further increase the likelihood that all or substantially all of the viscous substance 120 contained in the transverse bore 2A of the dispensing valve 2 is dispensed from the apparatus 100 into the capsule 100C or the other container to be filled. In such embodiments, a diameter of the transverse bore 2A and the dispensing piston 4 may be smaller than a diameter of the capsule 100C/container.

In some embodiments, the dispensing piston 4 defines a gas flow path 4g (FIG. 4) therethrough, which may extend axially through a length of the dispensing piston 4 and may terminate at the pushing surface 4p (FIG. 4) of the dispensing piston 4 that moves the substance 120 out of the bore 2A of the dispensing valve 2 and out of the outlet 110 of the apparatus 100. An inert gas, such as compressed air or compressed nitrogen, may be fed through the gas flow path 4g via a suitable pneumatic arrangement from a corresponding compressed gas source to the pushing surface 4p of the dispensing piston 4 (i.e., towards the outlet 7) to allow the viscous substance 120 to be easily dislodged from the dispensing piston 4 and inserted into the capsule 100C. More particularly, in some embodiments, a burst of the compressed gas out of the gas flow path 4g via the pushing surface 4p is executed when the pushing surface 4p is inside the capsule 100C being filled, so as to detach the metered substance 120 from the pushing surface 4p and deposit it into the capsule 100C.

In other embodiments, the dispensing piston 4 may include other feature(s) configured to detach the viscous substance 120 from the pushing surface 4p of the dispensing piston 4 and inserted into the capsule 100C. Once the viscous substance 120 is dispensed, the dispensing piston 4 may move back to its retracted position 126 and may thereby unblock rotation of the dispensing valve 2, thereby allowing for the injection, metering, and dispensing process described above to be repeated with respect to a next volume of the viscous substance 120 supplied into the inlet 108 of the apparatus 100.

To this end, in the present embodiment the dispensing piston 4 is biased to its retracted position 126 by a suitable mechanism, such as by a biasing assembly including a spring for example. As such, the dispensing piston 4 moves back to its retracted position 126 as soon as the operator stops applying a manual force to the active actuator 4A. It is contemplated that in embodiments in which the active actuator 4A is powered, the retraction to the retracted position 126 may be executed by the active actuator 4A. In some such embodiments, the dispensing piston 4 may be non-biased to the retracted position 126.

Figure 5:
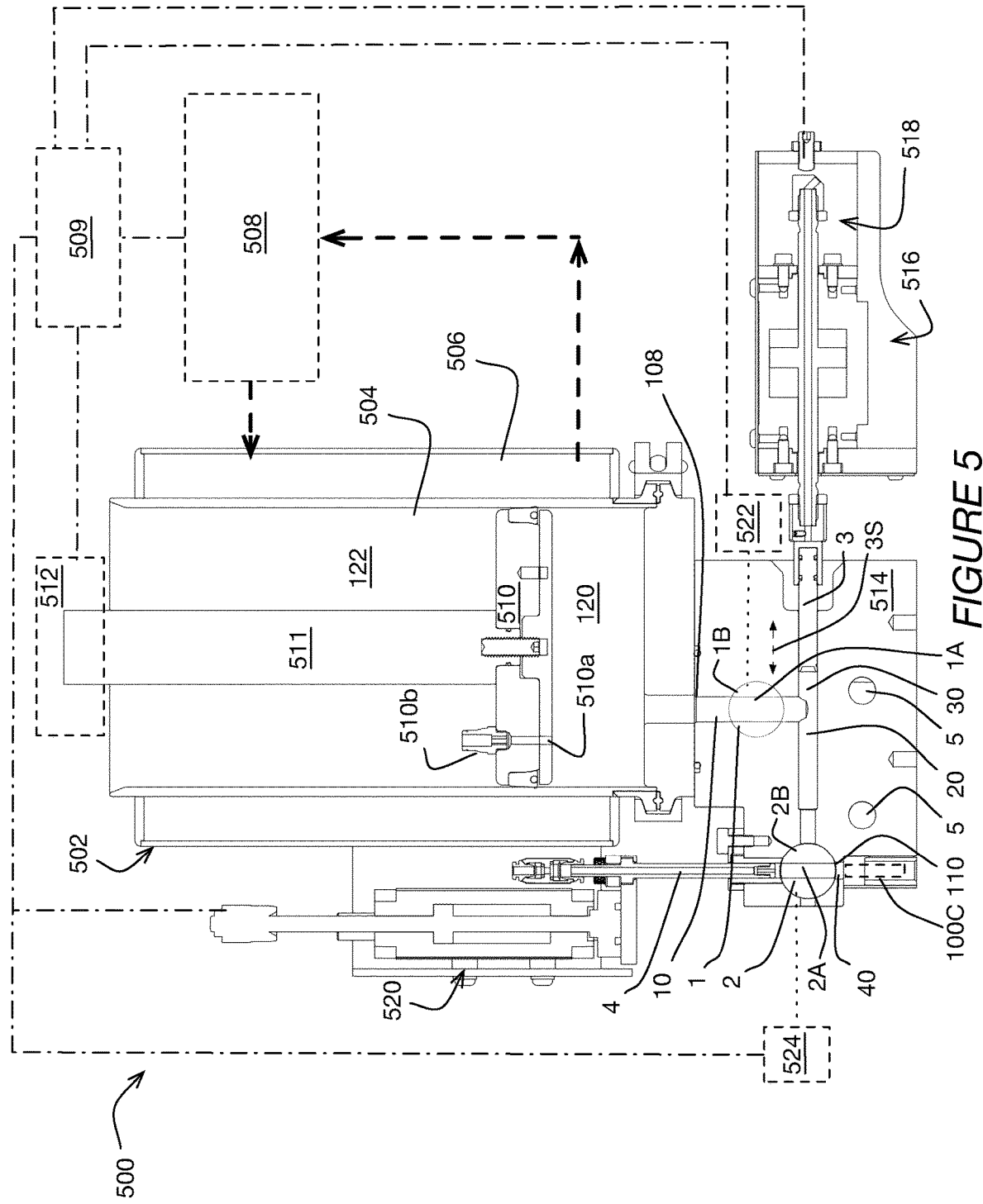
FIG. 5 is a cross-section of another embodiment of the apparatus of FIG. 1.
Figure 6:
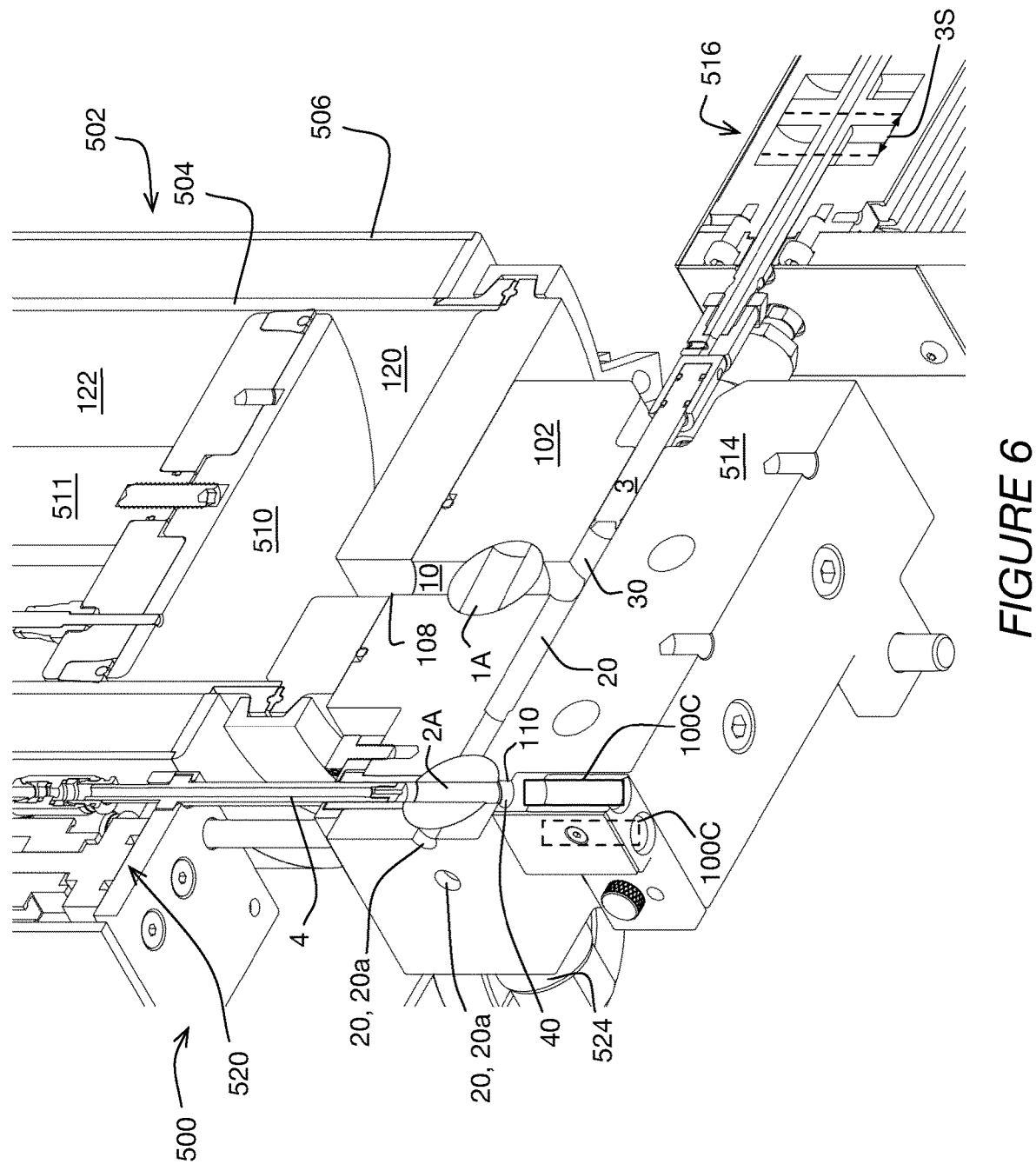
FIG. 6 is a close-up perspective view of the cross-section of the apparatus of FIG. 5.

Reference is now made to FIGS. 5 and 6, which show an apparatus 500 for metering and dispensing one or more viscous substances into one or more capsules. The apparatus 500 is another embodiment of the apparatus 100 and is similar to the apparatus 100. Therefore, components of the apparatus 500 that are similar to or the same as corresponding components of the apparatus 100 have been labeled with the same reference numerals and will not be described again in detail.

Referring to FIG. 5, a difference between the apparatus 100 and the apparatus 500 is that in the apparatus 500, the inlet 108 is defined by an outer end of the supply flow path 10. In this embodiment, the source 122 of the viscous substance 120 is a pressurized hopper 502 fluidly connected to the inlet 108 to deliver the viscous substance 120 to the inlet 108 and the supply valve 1. As shown, in this embodiment, the hopper 502 includes a cylindrical vessel 504 and a jacket 506 connected to an outer surface of the vessel 504 to transfer heat to or from the vessel 504. The hopper 502 is one example of a structure configured to pressurize and supply the substance 120 to the inlet 108. It is contemplated that a different structure configured to pressurize and supply the substance 120 to the inlet 108 could be used. For example, a structure having a screw-type pressurizer/compressor of the substance 120, driven by a suitable power source such as an electric motor, may be used in some embodiments.

To this end, as shown schematically in FIG. 5, the jacket 506 is disposed circumferentially about the vessel 504 and is fluidly connected to a heating and/or cooling system 508 which may provide and circulate a cooling and/or a heating fluid through the jacket 506 for heating or cooling the viscous substance 120 contained in the vessel 504. In the present embodiment, the heating and/or cooling system 508 is operatively connected to a controller 509 and is operated by the controller 509 as described later in this document.

The heating and/or cooling system 508 may be any suitable heating and/or cooling system, such as a conventional heating and/or cooling system, selected to suit each particular embodiment and application of the apparatus 100, 500. For example, the heating and/or cooling system 508 may be capable of keeping a temperature of the viscous substance 120 in the hopper 502 and/or in the apparatus 500 within a predetermined temperature range. To maintain temperature within the apparatus 500, the apparatus 500 may include a plurality of heating/cooling connections 5 operatively connected to the heating and/or cooling system 508 to receive heating or cooling therefrom, such as via a heating and/or cooling fluid. To this end, the heating/cooling connections 5, which may be defined by respective bores 5 in the body 102, 514 of the apparatus 500, may include one or more temperature sensors configured to detect a temperature of the viscous substance 120. Other temperature control means may likewise be used to maintain a desired operating temperature of the viscous substance 120 in the apparatus 500 and/or the hopper 502. In some embodiments, the heating and/or cooling system 508 may be omitted and/or may be remote to and separate from the apparatus 500.

The vessel 504 and the jacket 506 may be made from any material(s) suitable for each given application of the apparatus 500. For example, the vessel 504 and the jacket 506 may be made from a stainless steel or any other suitable material that will not react with the viscous substance 120. To help remove air from the hopper 502, the hopper 502 may include a port, a vacuum or vent configured to be opened to release air that may be contained in the viscous substance 120 in the vessel 504 to the atmosphere.

Still referring to FIG. 5, the hopper 502 includes a piston 510 extending disposed therein and connected to a rod 511 extending through a center of the vessel 504 and out of a top end of the vessel 504. The rod 511 is operatively connected to an actuator 512, which may be any suitable actuator selected to provide the required pressurization of the substance 120, such as for example a hydraulic actuator, an electric actuator, or a pneumatic actuator powered by a conventional corresponding power source. The actuator 512 is operable to move the piston 510 to press on the viscous substance 120 and to thereby supply the viscous substance 120 from the hopper 502 to the supply flow path 10 via the inlet 108 in the body 514 of the apparatus 500. In the present embodiment, the piston 510 defines a vent 510a therethrough, which is selectively sealable by a plug 510b of any suitable construction. The vent 510a may be opened by removing the plug 510b as the piston 510 moves to start pressurizing the substance 120, and may thereby allow for air or other gases to be removed from the substance via the vent 510a. Once the air/gases have been removed (which in one embodiment may be determined to be the case when the substance 120 starts exiting via the vent 510a), the plug 510b may be reinstalled to seal the vent 510a. In some embodiments, a different venting system may be provided, and in some cases this venting system may be omitted. In the present embodiment, the actuator 512 is operatively connected to the controller 509 and is operated by the controller 509 as described later in this document.

Still referring to FIG. 5, another difference between the apparatus 100 and the apparatus 500 is that the apparatus 500 has three sets of each of the supply flow path 10, the dispensing flow paths 20, 40, the metering flow path 30 etc., for metering and dispensing multiple volumes (V) of the substance 120 simultaneously. More particularly, in this embodiment, the apparatus 500 has three sets of corresponding: i) the flow paths 10, 20, 30, 40; ii) bores 1A, 2A, iii) pistons 3, 4, and powered actuators 516. Since in this embodiment each set is similar to the other sets, only one of the sets is shown in FIG. 5, to maintain clarity. In this embodiment, however, a single supply valve 1 with multiple (i.e. three) bores 1A and a single dispensing valve 2 with multiple (i.e. three) bores 2A is used, although a dedicated valve 1, 2 for one or more of the sets of the flow paths may be used. Understandably, the apparatus 500 may be constructed to have any other number of such parallel sets.

Yet another difference is that in this embodiment the dispensing flow paths 20 and the corresponding metering flow paths 30 are coaxial relative to each other, with each pair being defined by a single bore machined into the body 514 of the apparatus 500. Yet another difference is that in this embodiment, each of the supply flow paths 10 is perpendicular to both the corresponding dispensing flow path 20 and the corresponding metering flow path 30.

Yet another difference is that each of the metering pistons 3 of the apparatus 500 is operatively connected to a powered actuator 516 dedicated to that metering piston 3. Each of the powered actuators 516 is operable to move its respective the metering piston 3 from loaded position 3L to its unloaded position 3U. Each of the powered actuator 516 is operatively connected to the controller 509 and is operated and controlled thereby. The powered actuators 516 are pneumatic actuators powered by a suitable source of compressed air and control valves, but may be any other suitable type and combination of powered actuators, such as a hydraulic or an electric actuators for example.

In this embodiment, the metering pistons 3 are floating pistons because each of the powered actuators 516 is decoupled from its respective metering piston 3 so as to be operable to only push, and not pull, the respective metering piston 3 from the loaded position 3L to the unloaded position 3U (i.e. the actuator 516 is not attached to the metering piston 3 but aligned to be capable of pushing on the metering piston 3).

In some embodiments, a given powered actuator 516 is retracted after having pushed in a given metering/dispensing cycle as described above its respective metering piston 3 to the unloaded position 3U, and thereby allows the respective metering piston 3 to be pushed back to its loaded position 3L solely by the force of the pressurized substance 120 acting on the metering piston 3, to prepare for a subsequent metering/dispensing cycle. In this embodiment, each of the powered actuators 516 senses, via any suitable conventional/off-the shelf sensing arrangement, when its respective metering piston 3 is moved back to its loaded position 3L, and this signal is used by the controller 509 as a condition to executing each subsequent metering/dispensing cycle using the respective metering piston 3. In an aspect, this arrangement allows the powered actuators 516 to be not powered/actuated while "waiting" for the metering pistons 3 to be pushed back to their respective loaded positions 3L.

In this embodiment, each powered actuator 516 incorporates an adjustable stopper 518 therein, the adjustable stopper 518 being operable similarly to the adjustable stopper 15 described above. In some embodiments, the adjustable stopper 15, 518 may be omitted. For example, in some embodiments, each powered actuator 516 may itself provide the functionality of the adjustable stopper 15. As an example, in some embodiments each powered actuator 516 may be attached to its respective metering piston 3 and may be configured to provide an output to the controller 509 indicative of a "live" position of the metering piston 3 via a suitable one or more sensors or other means, such as via a conventional stepper motor arrangement for example.

In some such embodiments, the controller 509 may operate the powered actuator 516 to, for example, counteract the force exerted by the viscous substance 120 on the metering piston 3 to stop movement of the metering piston 3 when the metering piston 3 reaches a particular loaded position 3L that would provide a particular/predefined volume (V) of the by the viscous substance 120 to be dispensed. In some such embodiments, the location of the loaded position 3L, and hence the length of the stroke 3S of the metering piston 3 and the volume (V) to be metered and dispensed, may be adjustable electronically via corresponding one or more settings in the controller 509 to adjust the volume (V) to be metered and dispensed in a given one or more dispensing steps. In some decoupled embodiments as the one shown in FIGS. 5 and 6, a retracted position of each powered actuator 516 may be electronically adjustable via the controller 509 to pre-set a desired volume (V) to be metered and dispensed by the respective metering piston 3.

Yet another difference between the apparatus 100 and the apparatus 500 is that in the apparatus 500, each dispensing flow path 40 receiving the respective dispensing piston 4 is perpendicular to the respective dispensing flow path 20. However, in the present embodiment, a single powered actuator 520 is operatively connected simultaneously to all of the dispensing pistons 4 to simultaneously move the dispensing pistons 4 their extended positions 128 to execute the dispensing step simultaneously in all dispensing flow paths 40 in each metering/dispensing cycle.

The powered actuator 520 is operatively connected to the controller 509 and is operated and controlled thereby. The powered actuator 520 may be similar to the powered actuators 516 and is therefore not described in detail. Suffice it to say that the powered actuator 520, like the powered actuators 516, may be any suitable powered actuator, such as a conventional powered actuator, selected to provide for the dispensing functionality of the dispensing piston 4 as described in this document. Similarly, in some embodiments, the powered actuator 520 may be connected to the dispensing pistons 4 to selectively move them between the retracted 126 and the extended 128 positions in each metering/dispensing cycle. In other embodiments the powered actuator 520 may be decoupled from the dispensing pistons 4 so as to merely be operable to push the dispensing pistons 4 into their extended positions 128 to execute each given dispensing step, and may thereafter retract. In such embodiments, the dispensing pistons 4 may be biased toward their retracted positions 126, for example by one or more compression springs, so as to move back to the retracted positions 126 after each given dispensing step.

Another difference between the apparatus 100 and the apparatus 500 is that in the apparatus 500, each of the supply valve 1 and the dispensing valve 2, and more particularly the body 1B and the body 2B thereof, is connected to a respective powered actuator 522, 524. The powered actuators 522, 524 are operatively connected to the controller 509 and is operated and controlled thereby. The powered actuators 522, 524 are operable to rotate the supply valve 1 and the dispensing valve 2 between their respective open 112, 116 and closed 114, 118 positions. The powered actuators 522, 524 may be any suitable powered actuators selected to suit each particular embodiment of the valves 1, 2, such as conventional hydraulic, pneumatic, or electric actuators for example, and are therefore not described herein in detail.

Now referring to FIG. 6, the apparatus 500 includes a single inlet 108 that supplies the viscous substance 120 from the hopper 502 to each of the multiple supply flow paths 10. However, multiple inlets 108 and/or multiple hoppers 502, in some cases containing different viscous substances, may also be used.

Since each of the valves 1, 2 comprises multiple bores 1A, 2A, respectively, which service the multiple sets of the flow paths 10, 20, 30, only the two powered actuators 522 and 524 are used. However, it is contemplated that in other embodiments that use multiple supply valves 1 and/or multiple dispensing valves 2, multiple corresponding actuators 522, 524 may be used.

In the present embodiment, the controller 509 is an electronic controller, such as a conventional electronic programmable controller, selected to provide the functionality of the apparatus 500 as described in this document. Similarly, the operative connections between the controller 509 and the components of the apparatus 500 as described above, are suitable electronic connections, such as conventional electronic wiring and/or other communication components, selected to provide the functionality of the apparatus 500 as described in this document.

It is contemplated that the controller 509 could be any other type of suitable controller, such as a pneumatic controller with corresponding pneumatic control and/or actuation devices. It is also contemplated that multiple controllers 509, of one or more type, may be used to provide the functionality of the apparatus 500 as described in this document. It is contemplated that any other suitable operative connections between the controller 509 and the components of the apparatus 500, such as pneumatic lines in embodiments in which the controller 509 is a pneumatic controller, may be used.

With the above structure in mind, an example of an operation of the apparatus 500 executed via a non-limiting example configuration of the controller 509 is described next. In such a configuration, the controller 509 actuates the actuator 512 to move the piston 510 in the hopper 502 and to thereby suitably pressurize the viscous substance 120. The controller 509 then closes (or maintains closed, if applicable) the dispensing valve 2 and opens the supply valve 1, and thereby introduces the viscous substance 120 into the flow paths 10, 20 and 30 and fills the flow paths 10, 20 and 30 upstream of the dispensing valve 2.

The controller 509 continues pressurizing the viscous substance 120 so as to move the metering pistons 3 to the loaded position 3L, while receiving feedback signals from the actuators 516 associated with the metering pistons 3, or from other suitable position sensor(s) for example. When the feedback signals indicate to the controller 509 that the metering pistons 3 have reached the loaded position 3L, the controller 509 operates the actuator(s) 522 of the supply valve(s) 1 to move the supply valve(s) 1 to the closed position 114, and the actuator(s) 524 of the dispensing valve 2 to move the dispensing valve 2 to the open position 116. The controller 509 then operates the actuator(s) 516 of the metering pistons 3 to move the metering pistons 3 to the unloaded position 3U and to thereby move a predetermined volume of the viscous substance 120 into the bores 2A of the dispensing valve 2.

Once the metering pistons 3 have reached the unloaded position 3U, the controller 509 operates the actuator 524 of the of the dispensing valve 2 to move the dispensing valve 2 to the closed position 118 and thereby aligns the bores 2A of the dispensing valve 2 with corresponding ones of the dispensing pistons 4. The controller 509 then operates the actuator 520 of the dispensing pistons 4 to move the dispensing pistons 4 from the retracted position 126 to the extended position 128 and thereby dispenses the metered volumes of the viscous fluid 120 from the bores 2A of the dispensing valve(s) 2 into corresponding capsules 100C or other suitable containers that are disposed at and open to the outlets 110 of the apparatus 500.

The controller 509 may then actuate a suitable capsule/container replacement system (not shown), which may be a conventional system, to remove the filled capsules 100C/containers from the outlets 110 and replace them with a sequentially next set of unfilled capsules 100C/containers. The controller 509 may then retract the dispensing pistons 4 and may repeat the steps described above to fill the sequentially next set of unfilled capsules 100C/containers.

The controller 509 may execute the steps described above to keep filling new sets of unfilled capsules 100C/containers. The filling and metering of capsules 100C/containers may thereby be automated. Any suitable means, such as conventional position sensors providing feedback signals to the controller 509, may be used to allow the controller 509 to determine the various conditions described above, such as to determine when each of the metering pistons 3 have reached the unloaded position 3U for example, to enable the metering and dispensing operation. In the present embodiment, using a dedicated actuator 516 for each of the metering pistons 3 allows to configure the controller 509 to move each given metering piston 3 to the unloaded position 3U as soon as the given metering piston 3 is determined (via the respective feedback signal) to have reached its loaded position 3L. In some cases, this configuration may allow to increase a number of volumes metered and dispensed by the apparatus 500 over a given timeframe, by allowing to avoid having to stop operation of all metering pistons 3 in case one of the metering pistons 3 malfunctions, or in case a flow path associated with one of the metering pistons 3 becomes clogged, for example. That said, in some embodiments, a single actuator 516 for multiple metering pistons 3, or for all of the metering pistons 3, may be used.

While a particular sequence and timing of the steps is described above, it is contemplated that the sequence and/or timing of and/or at least some of the steps may differ, depending on each particular embodiment and application of the apparatus 500 for example. For example, in some configurations, the actuators 516 may be connected to the metering pistons 3 so as to be operable not only to push the metering pistons 3 to the unloaded position 3L, but also to pull the metering pistons 3 to the loaded position 3L. In some embodiments and/or applications, this may be done to supplement the force provided by the pressurized viscous substance 120 for example. In other embodiments and/or applications, in cases where a relatively fluid substance is to be metered and dispensed for example, this may be done to draw the substance 120 into the metering flow path 30, and in some such embodiments and/or applications the subsystem pressurizing the viscous substance 120 (e.g. the actuator 512 of the piston 510) may be omitted. In some such embodiments and/or applications, the controller 509 may control a force and/or speed with which the controller 509 moves the metering piston 3 to the loaded position 3L in order to reduce a likelihood of forming bubbles in the viscous substance 120. Any suitable control means capable of this control function may be used. As such, while the apparatus 500 is capable of metering and dispensing relatively viscous substances, the apparatus 500 may likewise be used to dispense relatively less viscous substances.

With regard to using the various embodiments of the apparatus 100, 500 described above to meter and dispense viscous substances, a given viscous substance may be a liquid, paste or a gel. In some examples in which a temperature of the hopper 502 is in a range of 53 to 57 degrees Celsius, a viscosity of the viscous substance may be from 10,000 to 60,000,000 cP, preferably 100,000 to 3,000,000 cP, and more preferably from 10,000 to 400,000 cP. In some embodiments, it has been found that the apparatus 100, 500 may allow to meter and dispense such substances while keeping the hopper 502 and/or the body 102, 514 at lower temperatures, as low as 30 degrees Celsius, 20 degrees Celsius, and for some substances even as low as 5 degrees Celsius. Using relatively lower temperatures allows to reduce heat loss from the apparatus 100, 500 and may therefore allow to reduce an energy consumption of the apparatus 100, 500, which may be material when considered over an extended period of use, such as in commercial production of capsules.

In some examples, the viscous substance may be a nutraceutical or active pharmaceutical ingredient that is highly viscous at room temperature, but which may nonetheless be metered and dispensed by the apparatus 100, 500. In some examples, the viscous substance may be, for example, extracts from plants, fats, phospholipids, ethereal oils and waxes. In some examples, the viscous substance may be a phospholipid-containing composition, an omega-3 phospholipid, phospholipid extracts or a krill oil derived mixture. In some examples, the viscous substance may be a krill oil derived mixture containing polyunsaturated fatty acids (PUFAs), primarily composed of omega-3 fatty acids, principally eicosapentaenoic acid (EPA) and docosahexaenoic acid (DHA).

While the apparatus 100 and the apparatus 500 have been described each having a given set of features, in other embodiments, an apparatus according to the present technology may have a different combination of features, such as a combination of some of the features of the apparatus 100 and some of the features of the apparatus 500 as an example. It is contemplated that any suitable materials and manufacturing methods may be used to manufacture an apparatus 100, 500 as described herein.

Figure 7:
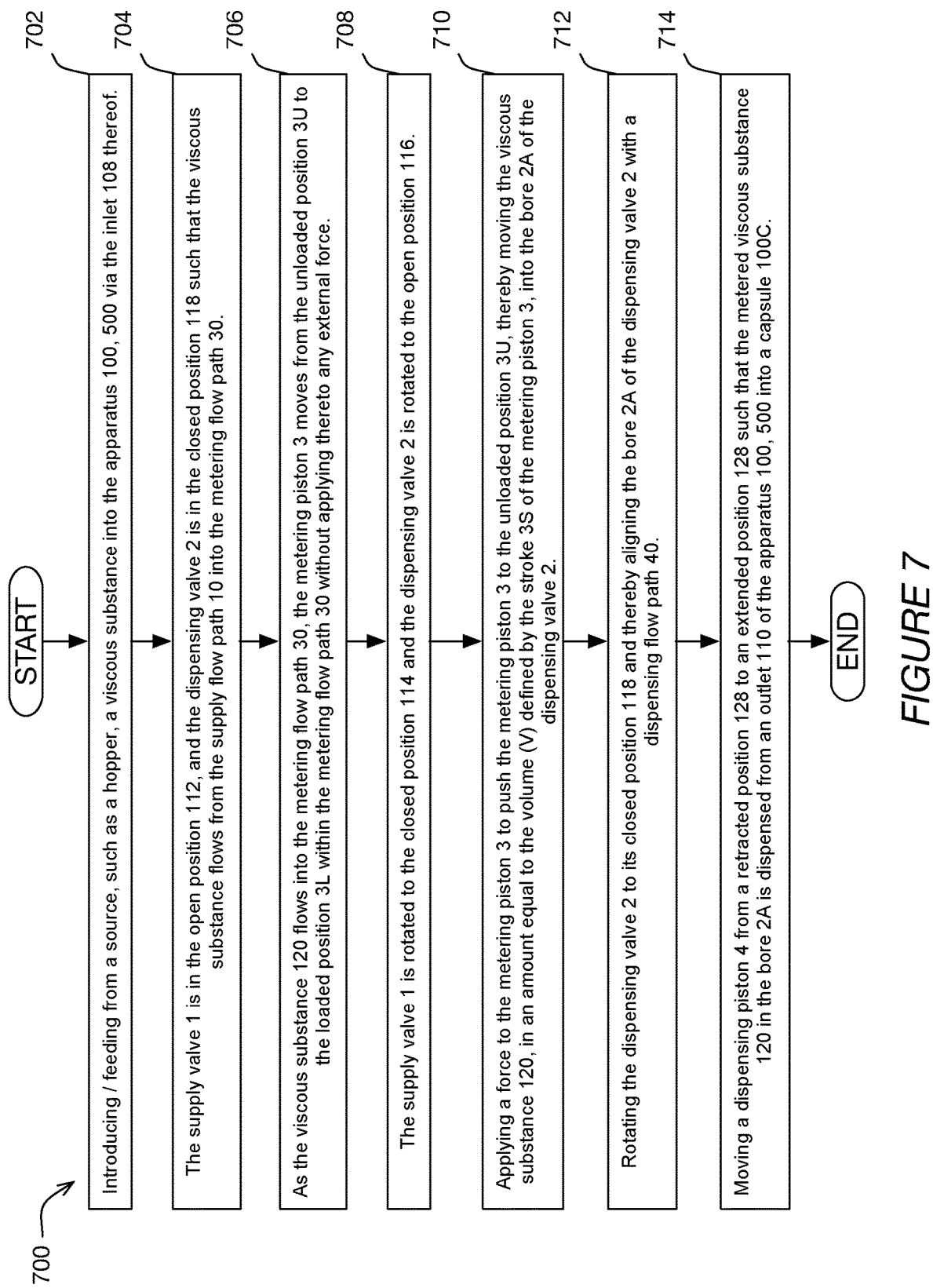
FIG. 7 is a flow chart illustrating steps of a method of operating the apparatuses of FIGS. 1 and 5.

Now referring to FIG. 7, with the above structure and various embodiments of the apparatus 100, 500 in mind, there is provided a method 700 of operating the apparatus 100, 500. While the method 700 is illustrated with respect to one set of flow paths 10, 20, 30, 40, pistons 3, 4, etc., multiple instances of the method 700 may be practiced for a plurality of flow paths and pistons, in any desired timing sequence, to for example fill multiple capsules 100C or other containers simultaneously.

The method 700 includes a Step 702 in which a viscous substance 120 is introduced from a source 122 of the viscous substance 120, such as the hopper 502, into the apparatus 100, 500 via the inlet 108. To facilitate introduction of and/or provide for the flow of the viscous substance 120, the source 122 may be pressurized, for example at 1 to 200 psi, at 50 to 150 psi, or at 100 to 120 psi, with the particular pressure being selected depending on the viscosity of the particular substance to be metered and dispensed at the particular chosen operating temperature of the apparatus 100, 500. From the inlet 108, the viscous substance 120 may flow through the supply flow path 10 to the supply valve 1 disposed therein.

In Step 704, the supply valve 1 is in the open position 112, and the dispensing valve 2 is in the closed position 118 such that the viscous substance 120 flows from the respective supply flow path 10 into the respective metering flow path 30. In Step 706, as the viscous substance 120 flows into the respective metering flow path 30, the metering piston 3 moves from the unloaded position 3U to the loaded position 3L within the metering flow path 30 under pressure of the substance 120 without applying any external force to the metering piston 3. Step 706 ends when the metering piston 3 reaches the loaded position 3L (i.e., when the metering piston 3 reaches the stopper 518 or when the actuator 516 or other position sensing means makes this determination, as described above).

In Step 708 the supply valve 1 is moved to the closed position 114 and the dispensing valve 2 is moved to the open position 116. Of note is that in embodiments in which the viscous substance 120 is pressurized at the inlet 108, closure of the supply valve 1 ensures that no more pressure is applied from the source 122 on the viscous substance 120 downstream of the supply valve 1, and this reduces a risk that too much of the viscous substance is dispensed into the capsule 100C at the subsequent dispensing step of the method 700. This positioning of the supply valve 1 and the dispensing valve 2 also prevents the introduction of additional viscous substance 120 into the metering flow path 30 and prevents backflow of the viscous substance 120, and thereby further helps increase an accuracy of the metering and dispensing steps. In Step 708, the dispensing piston 4 is in the retracted position 126 (see FIG. 5).

In Step 710, a force is applied to the metering piston 3 to push the metering piston 3 to the unloaded position 3U, thereby moving a volume of the viscous substance 120, equal to the volume (V) defined by the pre-determined stroke 3S of the metering piston 3, into the respective bore 2A of the dispensing valve 2. In the case of the apparatus 100, the force is applied manually by the lever 124. In the case of the apparatus 500, the force is applied by the actuator 516.

In Step 712, the dispensing valve 2 is moved to its closed position 118. In the closed position 118, the respective bore 2A in the dispensing valve 2 is aligned with the respective dispensing flow path 40. In Step 714, the respective dispensing piston 4 is moved from the retracted position 126 to the extended position 128 such that the contents of the respective bore 2A of the dispensing valve 2 (i.e., the metered viscous substance 120 in the bore 2A) is dispensed from the respective outlet 110 into the capsule 100C (or any other desired packaging or storage container). Steps 712 and 714 may be performed sequentially or simultaneously and/or with particular timings selected to suit each particular embodiment of the apparatus 100, 500. After the metered volume (V) of the viscous substance 120 is dispensed, the respective dispensing piston 4 returns to the retracted position 126.

In at least some embodiments and for some viscous substances 120, at least substantially no air bubbles are introduced into the viscous substance 120 during the method 700 at least in part because the metering flow path 30 is full of the viscous substance 120 and because no suction is applied to the viscous substance 120 during the method 700.

By using the apparatus and method described above, it is possible to meter and fill a capsule with a precise, predetermined amount of viscous substance in an accurate, efficient, and repeatedly consistent manner. The configuration of the apparatus helps reduce a risk of air being present in the flow paths 10, 20, 30, 40, where the presence of air could adversely affect the amount of viscous substance 120 metered and dispensed to the capsule(s) 100C. By performing at least some method steps in parallel and/or filling a plurality of capsules 100C simultaneously, a speed and output of the method 700 may be increased.

Figure 8:
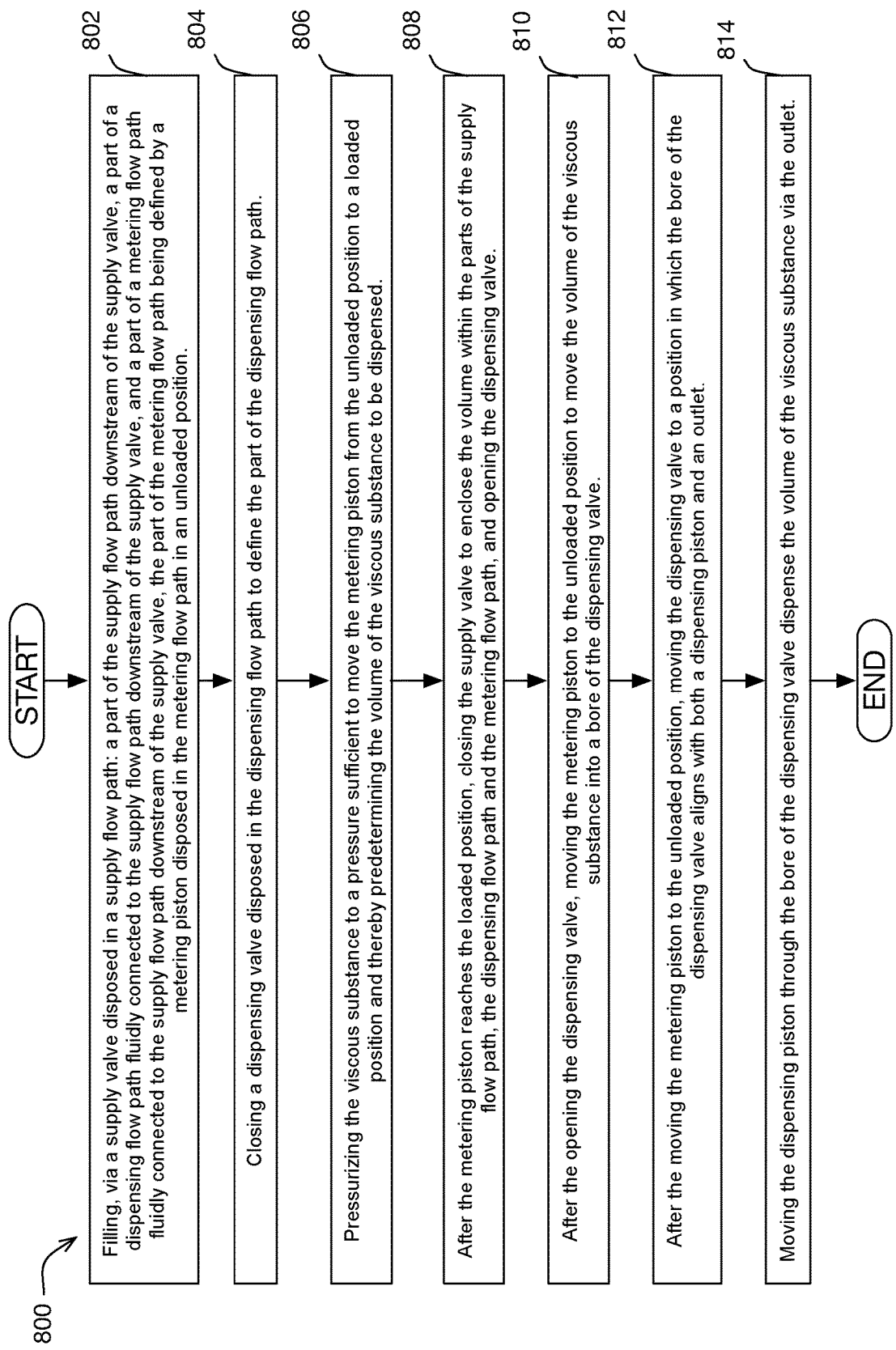
FIG. 8 is a flow chart illustrating steps of a method of metering and dispensing a volume of a viscous substance.

Now referring to FIG. 8, with the above structure and various embodiments of the apparatus 100, 500 in mind, there is provided a method 800 of metering and dispensing a volume (V) of a viscous substance 120. The method 800 includes a step 802 of filling, via a supply valve 1 disposed in a supply flow path 10: a part of the supply flow path downstream of the supply valve 1, a part of a dispensing flow path 20 fluidly connected to the supply flow path 10 downstream of the supply valve 1, and a part of a metering flow path 30 fluidly connected to the supply flow path 1 downstream of the supply valve 1. As seen above, in some embodiments, the part of the metering flow path 30 being filled is defined by a metering piston 30 disposed in the metering flow path 30 in an unloaded position 3U.

The method 800 may include a step 804 of closing a dispensing valve 2 disposed in the dispensing flow path 20 to define the part of the dispensing flow path 20 that is filled at step 802, for example before or during step 802.

The method 800 may include a step 806 of pressurizing the viscous substance 120 to a pressure sufficient to move the metering piston 3 from the unloaded position 3U to a pre-defined loaded position 3L and thereby predetermining the volume (V) of the viscous substance 120 to be dispensed.

After the metering piston reaches the loaded position 3L, the method 800 may proceed with a step 808 of closing the supply valve 1 to enclose the volume (V) within the parts of the supply flow path 10, the dispensing flow path 20 and the metering flow path 30, and opening the dispensing valve 2.

After the opening the dispensing valve 2, the method 800 may proceed with a step 810 of moving the metering piston 3 to the unloaded position 3U to move the volume (V) of the viscous substance 120 into a bore 2A of the dispensing valve 2.

After the moving the metering piston 3 to the unloaded position 3U, the method 800 may proceed with a step 812 of moving the dispensing valve 2 to a position, such as the closed position 118 in the embodiments above, in which the bore 2A of the dispensing valve 2 aligns with both a dispensing piston 4 and an outlet, such as the outlet 110 of the apparatus 100 or 500 above. As seen in the example embodiments above, in some cases, the position 118 in which the bore 2A of the dispensing valve 2 aligns with both the dispensing piston 4 and the outlet 110 is a position in which the dispensing valve 2 fluidly interrupts the dispensing flow path 20.

The method 800 may then proceed with a step 814 of moving the dispensing piston 4 through the bore 2A of the dispensing valve 2 dispense the (predetermined) volume (V) of the viscous substance 120 via the outlet 110. As seen in the example embodiments described above, in some cases, the moving the dispensing piston 4 through the bore 2A of the dispensing valve 2 includes moving the dispensing piston 4 into the outlet 110. Similarly, in some cases, the moving the dispensing piston 4 through the bore 2A of the dispensing valve 2 includes moving the dispensing piston 4 to extend out of the outlet 110.

As seen above, in some cases, the dispensing via the outlet 110 may be into a capsule 100C positioned at or proximate to that outlet 110. In some cases, the method 800 may terminate at step 814. In other cases, and as seen above, the method 800 may further include steps of replacing the filled capsule 100C with a new/unfilled capsule 100C and repeating steps 802 to 814 with respect to the new/unfilled capsule 100C. Also, in some cases, the method 800 may include a step of adjusting the loaded position 3L and/or the unloaded position 3U of the metering piston 3, for example by adjusting a manual adjustment mechanism 15, 518 or by preprogramming the controller 509 accordingly. Such a step may be used to adjust the (i.e. magnitude of) volume (V) of the viscous substance 120 to be dispensed.

More particularly, in some embodiments and applications, the step may include adjusting a magnitude of the stroke 3S of the metering piston 3, for example by adjusting the loaded position 3L and/or the unloaded position 3U automatically by the controller 509, in order to pre-determine a particular quantity (Q) of an ingredient to be dispensed into a given capsule 100C, the ingredient being contained in the substance 120 being fed to an apparatus 100, 500 of the present technology. Once a particular volume (V) that would provide the desired quantity (Q) is determined by the controller 509, the controller 509 may adjust the stroke 3S of the metering piston 3 to a magnitude that will provide the calculated volume (V).

The rest of the method 800 may then be executed to meter and dispense the particular pre-determined volume (V). In an aspect, this additional process may help further improve an accuracy of the filling of capsules 100C or other containers. In some embodiments, this process may be executed using a corresponding algorithm programmed into the controller 509 and using corresponding conventional sensor array(s) and/or other measurement means added to and/or upstream of the inlet(s) 108 of the apparatus 500 at corresponding suitable locations and operatively connected to the controller 509 to enable the controller 509 to automatically execute the determinations and analysis steps described above, and to automatically accordingly adjust the stroke 3S of the metering piston 3.

In some embodiments, the process may be executed by the controller 509 at given intervals, for example prior to starting the metering and dispensing for a given batch of capsules 100C to be filled. In some embodiments, the method may be executed by the controller 509 in a "live" mode, for each metering piston 3, prior to executing each given metering and dispensing cycle by that metering piston 3. In some embodiments, however, the process may be omitted.

In some embodiments, it is contemplated that the apparatus 500 may be configured to meter/dispense 1 to 500 capsules per minute. In some of the embodiments described above, it is contemplated that the apparatus 500 may be configured to meter/dispense up to 1500 capsules per minute, or more, depending on the number of parallel flow/dispensing paths and the particular embodiment of the actuators and controls used. In some embodiments, it is contemplated that the apparatus 500 may be configured such that the predetermined amount of the viscous substance containing the active ingredient may be dispensed at a rate of 1 g to 500 g of active substance per minute. In other embodiments, it is contemplated that the apparatus 500 may be configured such that the predetermined amount of the viscous substance containing the active ingredient may be dispensed at a rate of 5 g to 1500 g of active substance per minute.

The construction and arrangements of the apparatus, as shown in the various exemplary embodiments, are illustrative only, and may be manufactured and assembled using conventional materials, components (e.g. off-the shelf type actuators, assay sensor array(s), programmable controls, etc.) and manufacturing and assembly methods. Although only a few embodiments have been described in detail in this disclosure, many modifications are possible (e.g., variations in sizes, dimensions, structures, shapes and proportions of the various elements, values of parameters, mounting arrangements, use of materials, colors, orientations, image processing and segmentation algorithms, etc.) without materially departing from the novel teachings and advantages of the subject matter described herein.

For example, while a particular type and number of valves 1, 2 is described above, it is contemplated that a different number and/or type of valves 1, 2 may be used. As another example, while in the embodiment of the apparatus 500 described above, the surface of the metering piston 3 that pushes the substance 120 is always upstream of the junction between the flow paths 10, 20, 30, in some embodiments, components of the apparatus 500 may be sized so that the pushing surface of the metering piston 3 may enter the dispensing flow path 20 as the metering piston 3 is pushed into its unloaded position 3U. In some such embodiments, additional flow passages for the substance 120 may be provided to supply the substance 120 downstream of the pushing surface of the metering piston 3 so as to allow the substance 120 to push on the pushing surface and thereby move the metering piston 3 from its unloaded position 3L to its loaded position 3L.

Some elements shown as integrally formed may be constructed of multiple parts or elements, the position of elements may be reversed or otherwise varied, and the nature or number of discrete elements or positions may be altered or varied. The order or sequence of any process, logical algorithm, or method steps may be varied or re-sequenced according to alternative embodiments. Other substitutions, modifications, changes and omissions may also be made in the design, operating conditions and arrangement of the various exemplary embodiments without departing from the scope of the present invention.

Any of the automated systems described above may also include a display or output device, an input device such as a key-board, mouse, touch screen or other input device, and may be connected to additional systems via a logical network. Many of the embodiments described herein may be practiced in a networked environment using logical connections to one or more remote computers having processors. Logical connections may include a local area network (LAN) and a wide area network (WAN) that are presented here by way of example and not limitation. Such networking environments are commonplace in office-wide or enterprise-wide computer networks, intranets and the Internet and may use a wide variety of different communication protocols.

Those skilled in the art can appreciate that such network computing environments can typically encompass many types of computer system configurations, including personal computers, hand-held devices, multi-processor systems, microprocessor-based or programmable consumer electronics, network PCs, minicomputers, mainframe computers, and the like. Embodiments of the invention may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

Various embodiments are described in the general context of method steps, which may be implemented in one embodiment by a program product including computer-executable instructions, such as program code, executed by computers in networked environments. Generally, program modules include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps.

Software and web implementations of the embodiments could be accomplished with standard programming techniques with rule based logic and other logic to accomplish the various database searching steps, correlation steps, comparison steps and decision steps. It should also be noted that the words "component" and "module," as used herein and in the claims, are intended to encompass implementations using one or more lines of software code, and/or hardware implementations, and/or equipment for receiving manual inputs.

References herein to the positions of elements (e.g., "top," "bottom," "above," "below," etc.) are used to describe the orientation of various elements in the Figures. It should be noted that the orientation of various elements may differ according to other exemplary embodiments, and that such variations are intended to be encompassed by the present disclosure.

The embodiments and variations described above and illustrated are intended to be non-limiting examples only.

The invention claimed is:

1. An apparatus for metering and dispensing a predetermined amount of a viscous substance, comprising:
   an inlet fluidly connected to a supply flow path that branches into a metering flow path and a first dispensing flow path, the first dispensing flow path branching into a second dispensing flow path that is angled relative to the first dispensing flow path;
   a supply valve movable between an open position and a closed position, the supply valve disposed in the supply flow path;
   a dispensing valve movable between an open position and a closed position, the dispensing valve disposed in the first dispensing flow path and the second dispensing flow path;
   a metering piston disposed in the metering flow path and being movable in the metering flow path between an unloaded position and a loaded position; and
   a dispensing piston movable between a retracted position in which the dispensing piston is disposed outside of the dispensing valve and an extended position in which the dispensing piston extends through the dispensing valve into the second dispensing flow path to dispense the predetermined amount of the viscous substance via the second dispensing flow path.

2. The apparatus of claim 1, further comprising a structure configured to pressurize and supply the substance to the inlet, and wherein the metering piston is configured to be moved from the unloaded position to the loaded position solely by the pressurized substance in the metering flow path pressing on the metering piston while the supply valve is in the open position.

3. The apparatus of claim 1, wherein the dispensing valve is a rotary valve defining a bore therethrough, the bore being: i) out of alignment with the first dispensing flow path and in alignment with the second dispensing flow path when the dispensing valve is in the closed position, and ii) in alignment with the first dispensing flow path and out of alignment with the second dispensing flow path when the dispensing valve is in the open position.

4. The apparatus of claim 1, wherein:
   when the supply valve is in the open position, a bore of the supply valve is aligned with the supply flow path,
   when the supply valve is in the closed position, the bore of the supply valve out of alignment with the supply flow path,
   when the dispensing valve is in the open position, a bore of the dispensing valve is aligned with the first dispensing flow path, and
   when the dispensing valve is in the closed position, the bore of the dispensing valve is aligned with the second dispensing flow path and with the dispensing piston, the dispensing piston extending through the bore of the dispensing valve in the extended position.

5. The apparatus of claim 4, wherein:
   a portion of the supply flow path downstream of the supply valve, a portion of the metering flow path upstream of the metering piston, and a portion of the first dispensing flow path upstream of the dispensing valve define:
   a first enclosed volume when the supply valve and the dispensing valve are in the closed position and the metering piston is in the loaded position, and
   a second enclosed volume when the supply valve and the dispensing valve are in the closed position and the metering piston is in the unloaded position;
   the first enclosed volume is larger than the second enclosed volume, a difference between the first and second enclosed volumes defines the predetermined amount of the viscous substance.

6. The apparatus of claim 1, wherein when the dispensing valve is in the closed position, a bore of the dispensing valve is aligned with the second dispensing flow path.

7. The apparatus of claim 6, wherein when the dispensing valve is in the closed position, the dispensing piston is aligned with the bore of the dispensing valve and the second dispensing flow path, the dispensing piston being sized to sweep through the bore and the second dispensing flow path to dispense substantially all of the substance contained in the bore.

8. The apparatus of claim 7, wherein when the dispensing piston is in the extended position, an end of the dispensing piston aligns with an outlet defined by the second dispensing flow path.

9. The apparatus of claim 7, wherein when the dispensing piston is in the extended position, an end of the dispensing piston extends out of an outlet defined by the second dispensing flow path.

10. The apparatus of claim 9, wherein supply flow path is angled relative to the first dispensing flow path and the first dispensing flow path is angled relative to the second dispensing flow path.

11. The apparatus of claim 9, comprising a stopper that defines the loaded position of the metering piston and thereby defines a length of a stroke of the metering piston between the unloaded position and the loaded position, the stopper being adjustable to adjust the length of the stroke.

12. The apparatus of claim 1, further comprising:
   a first actuator operatively connected to the supply valve to move the supply valve between the open position and the closed position;
   a second actuator operatively connected to the dispensing valve to move the dispensing valve between the open position and the closed position;
   a third actuator operatively connected to the metering piston to move the metering piston from the loaded position to the unloaded position; and
   a fourth actuator operatively connected to the dispensing piston to move the dispensing piston from the retracted position to the extended position.

13. The apparatus of claim 12, further comprising a controller operatively connected to the first, second, third and fourth actuators to operate the first, second, third and fourth actuators.

14. The apparatus of claim 13, further comprising a hopper fluidly connected to the inlet, the hopper including a piston operable by a fifth actuator to pressurize and supply the viscous substance into the inlet, and the controller is operatively connected to the fifth actuator to operate the fifth actuator.

15. A method of metering and dispensing a volume of a viscous substance, comprising:
   filling, via a supply valve disposed in a supply flow path:
   a part of the supply flow path downstream of the supply valve, a part of a dispensing flow path fluidly connected to the supply flow path downstream of the supply valve, and a part of a metering flow path fluidly connected to the supply flow path downstream of the supply valve, the part of the metering flow path being defined by a metering piston disposed in the metering flow path in an unloaded position;

closing a dispensing valve disposed in the dispensing flow path to define the part of the dispensing flow path;

pressurizing the viscous substance to a pressure sufficient for the viscous substance to move the metering piston from the unloaded position to a predetermined loaded position and thereby predetermining the volume of the viscous substance to be dispensed;

after the metering piston reaches the loaded position, closing the supply valve to enclose the volume within the parts of the supply flow path, the dispensing flow path and the metering flow path, and opening the dispensing valve;

after the opening the dispensing valve, moving the metering piston to the unloaded position to move the volume of the viscous substance into the dispensing valve;

after the moving the metering piston to the unloaded position, moving the dispensing valve to a position in which the bore of the dispensing valve aligns with both a dispensing piston and an outlet; and moving the dispensing piston through the bore of the dispensing valve to dispense the volume of the viscous substance via the outlet.

16. The method of claim 15, wherein the moving the dispensing piston through the bore of the dispensing valve includes moving the dispensing piston into the outlet.

17. The method of claim 15, wherein the moving the dispensing piston into the outlet includes extending the dispensing piston to extend out of the outlet.

18. The method of claim 15, wherein the closing the dispensing valve is executed prior to the filling.

19. The method of claim 15, wherein the position in which the bore of the dispensing valve aligns with both the dispensing piston and the outlet is a position in which the dispensing valve fluidly interrupts the dispensing flow path.

20. The method of claim 15, comprising adjusting the loaded position to adjust the volume of the viscous substance to be dispensed.

* * * * *